United States Patent
Lesage et al.

(10) Patent No.: US 10,024,574 B2
(45) Date of Patent: Jul. 17, 2018

(54) CONDENSING WATER HEATER WITH DIELECTRICALLY INSULATED SECONDARY FLUE

(71) Applicant: MICLAU-S.R.I. INC., Montreal-East (CA)

(72) Inventors: Claude Lesage, Poite-Claire (CA); Jean-Claude Lesage, Kirkland (CA)

(73) Assignee: MICLAU-S.R.I. INC, Montreal, QC (CA)

( * ) Notice: Subject to any disclaimer, the term of this patent is extended or adjusted under 35 U.S.C. 154(b) by 769 days.

(21) Appl. No.: 14/121,994

(22) Filed: Nov. 13, 2014

(65) Prior Publication Data

US 2016/0138827 A1    May 19, 2016

(51) Int. Cl.
*F24H 8/00* (2006.01)
*F24H 1/20* (2006.01)
*F24H 9/00* (2006.01)
*F24H 9/06* (2006.01)
*F24H 9/12* (2006.01)

(52) U.S. Cl.
CPC .............. *F24H 8/00* (2013.01); *F24H 1/205* (2013.01); *F24H 9/0031* (2013.01); *F24H 9/06* (2013.01); *F24H 9/124* (2013.01); *Y02B 30/102* (2013.01)

(58) Field of Classification Search
USPC ....................................... 122/18.31
See application file for complete search history.

(56) References Cited

U.S. PATENT DOCUMENTS

| | | | | |
|---|---|---|---|---|
| 3,463,613 | A * | 8/1969 | Fenske ................... | G01N 21/72 208/DIG. 1 |
| 6,269,780 | B1 * | 8/2001 | Hughes ................... | F24H 9/124 122/14.3 |
| 2009/0301406 | A1 * | 12/2009 | Ritsema ................. | F24H 1/205 122/13.01 |
| 2011/0214621 | A1 * | 9/2011 | Boros ....................... | F24H 1/18 122/18.31 |
| 2014/0339821 | A1 * | 11/2014 | Ishizaka .................. | F16L 37/12 285/319 |

* cited by examiner

*Primary Examiner* — Alissa Tompkins
*Assistant Examiner* — John Bargero
(74) *Attorney, Agent, or Firm* — Houle Patent Agency, Inc.

(57) ABSTRACT

A high efficiency condensing flue gas-fired water heater is provided with a secondary tubular flue mounted inside the water tank and secured thereto by dielectric connectors to electrically isolate the secondary tubular flue from the tank. The secondary tubular flue has an intermediate helical section and opposed connecting end sections which each form a part of the dielectric connectors. The connectors do not require any welding for its installation to the tank and a compression nut and dielectric insulators provide for a leak proof and electrically isolated connection. The method of securing the secondary tubular flue is also described.

31 Claims, 5 Drawing Sheets

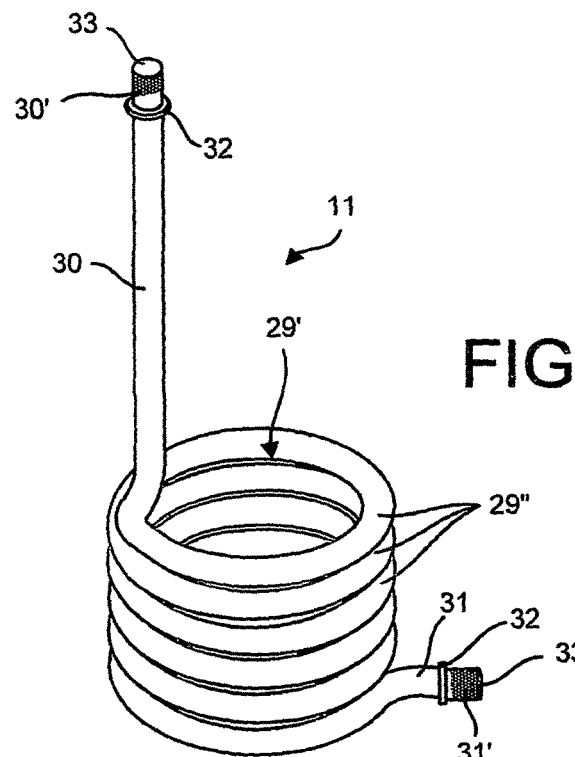
FIG. 5A
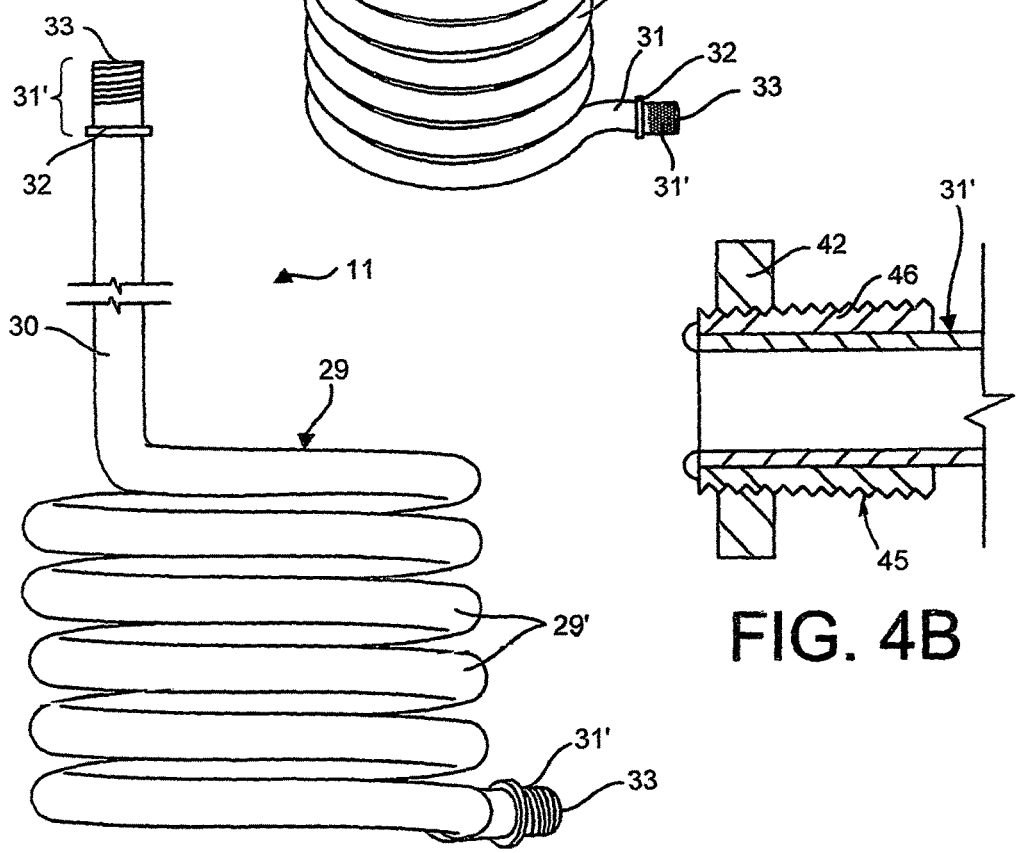
FIG. 4B
FIG. 5B

CONDENSING WATER HEATER WITH DIELECTRICALLY INSULATED SECONDARY FLUE

TECHNICAL FIELD

The present invention relates to condensing flue water heaters, and particularly to a condensing flue water heater wherein a dielectrically insulated secondary flue is mounted inside the water holding tank of the water heater.

BACKGROUND OF THE INVENTION

Gas-fired, condensing water heater manufacturers, continuously strive to increase the efficiency of the water heater, that is to say the percentage of the combustion energy which is transferred to the water being heated in the tank. Such water heaters produce condensation and the heat released by the water vapor is relatively high and a large amount of energy of combustion is contained therein. By condensing this hot water vapor to exchange its heat with the water, the thermal efficiency of the water heater can be increased in the order of at least 90%.

One method of increasing the efficiency has been to capture the hot gases leaving the flue of the water heater and recycling these in an external heat exchanger to heat water to be fed back to the tank of the water heater or to use it for other purposes.

More recently some fabricators have constructed water heaters wherein the flue is extended to make a second pass into the tank for heat exchange with the water being heated and thereby increasing the efficiency. An example of such design can be found in U.S. Pat. No. 7,836,856 wherein it is stated that 80% of the heat from the combustion gases is transferred to the water within the water tank through the wall of the central flue without condensation, and an additional 10% or more of the combustion heat is transferred to the water accompanied by condensation of water in a coiled flue section which is welded to the top end of the central flue which is closed. The coil is supported by connecting rods which are welded to the base and the coil whereby to dispose the coil about the central flue at a downward angle to evacuate the condensation liquid. The bottom end of the coil exits the tank through a hole and welded thereabout. The installation of such an assembly is difficult and different type metal come into contact inside the tank and this would result in early deterioration of the sacrificial anode which is mounted in the tank to prevent corrosion of the submerged exposed metal leading to lower tank life.

Another example of such designs is disclosed in U.S. Pat. No. 7,992,526 wherein the central flue exits the top wall of the tank and the hot gases are fed back by a blower mounted on the top wall, into a second pass straight flue conduit, of fairly large diameter, extending through the top wall and extending into the tank to exit the tank at a lower side end thereof. Both flue conduits can be fitted with baffles to increase its efficiency and such baffles are well known in the art. The installation of the second pass flue requires the cutting of large holes in the tank wall to position the top and bottom end of the second pass flue and thereafter welds have to be made to seal the gaps between the second pass flue and the tank wall. Because of the large diameter of the second pass flue, the size of the holes need to be fairly large and of oblong shape to permit the flue ends to be fished there through resulting in difficult weld seams which could develop leaks and these welds create a different metal exposure to the inside of the tank and thus increasing further deterioration of the sacrificial anode causing it to be consumed earlier which results in the formation of corrosion inside the tank and a reduction in the life span of the water heater. The assembly of such water heaters is also difficult and more costly although they yield an efficiency exceeding 90%.

SUMMARY OF THE INVENTION

It is a feature of the present invention to provide a condensing flue water heater fitted with a secondary tubular flue mounted inside the tank and which overcomes the above mentioned disadvantages of known condensing flue water heaters such as those described above.

Another feature of the present invention is to provide a condensing flue water heater wherein the secondary tubular flue is connected to the tank wall by dielectric connectors and which do not require any welding to the tank wall.

A still further feature of the present invention is to provide a condensing flue water heater wherein the secondary tubular flue connectors are self sealing by an external bolt connection.

Another feature of the present invention is to provide a condensing flue water heater wherein the dielectric connectors preserve the integrity of the tank as compared to weld connections.

Another feature of the present invention is to provide a condensing flue water heater wherein the secondary tubular flue is secured inside the tank independent from the tank walls and thus maintaining the tank and the glass lining integrity.

A still further feature of the present invention is to provide a condensing flue water heater wherein the thermal efficiency of the water heater is increased up to about 99%.

A further feature of the present invention is to provide a condensing flue water heater wherein a baffle plate may be disposed inside the tank to stratify the bottom portion of the tank in a colder water zone where the helical section of the secondary flue is disposed to increase the differential in temperature between the flue gases in the helical section with the surrounding water temperature.

A further feature of the present invention is to provide a condensing flue water heater provided with a secondary flue coupled to the primary flue and mounted inside the water holding tank of an up-fired or down-fired condensing water heater.

A still further feature of the present invention is to provide a secondary tubular flue adapted to be mounted to a tank wall by dielectric connectors which are entirely securable from outside the tank wall.

Another feature of the present invention is to provide a method of securing a secondary tubular flue in a water holding tank of a bottom fired water heater which is simple, economical and which does not require the formation of welds.

According to the above features, from a broad aspect, the present invention provides a condensing flue water heater having a water holding tank with a combustion chamber at a bottom end of the tank. At least one sacrificial anode is disposed in the water holding tank. A primary flue extends through the tank and communicates at a bottom end thereof with the combustion chamber. The primary flue exits the top wall of the tank through an exit opening. A secondary tubular flue is disposed in the water holding tank and has a helical section. The secondary tubular flue has a top connecting end section adapted to form part of a top dielectric tank connector for securement in a hole formed in a wall in a top part of the tank. The secondary tubular flue has a bottom connecting end section adapted to form part of a bottom dielectric tank connector for securement in a hole formed in a side wall of the thank spaced above the combustion chamber. A flue connecting means interconnects the exit opening of the primary flue with a top opening of the secondary flue. A blower displaces the combustion gas from the combustion chamber through the primary flue and the secondary tubular flue and through an exhaust pipe, to atmosphere.

According to another broad aspect of the present invention there is provided a secondary tubular flue for connection in a water holding tank of a gas-fired water heater to increase the efficiency of the water heater. The secondary tubular flue has opposed tubular end sections and a helical tubular section integrally formed. The tubular end sections each have connecting end sections adapted to form a part of a dielectric tank connector for securing the secondary tubular flue inside the water holding tank by the dielectric connectors.

According to a still further broad aspect of the present invention there is provided a method of securing a secondary tubular flue in a water holding tank of a bottom-fired water heater. The method comprises the steps of providing a secondary tubular flue conduit having opposed straight tubular end sections and a helical section integrally formed. The tubular end sections each have a pressure flange immovably secured transversely thereabout and spaced a predetermined distance from a free end thereof. A dielectric gasket is positioned about the free ends of the opposed straight tubular end sections to abut against an outer surface of the pressure flange. The secondary flue is inserted from a bottom open end of the water holding tank prior to installing a bottom wall of the water holding tank with the bottom wall having a straight central flue secured thereto. An upper one of the opposed straight tubular sections is positioned in a hole formed in a top end section of the water holding tank and a lower one of the opposed straight tubular section is positioned in a hole formed in a side wall of the water holding tank spaced a predetermined distance from the bottom wall of the tank to be later installed. The dielectric tank connector is assembled onto an end section of each of the straight tubular end sections to connect the tubular end sections to the tank by an electrically insulated and leak proof connection.

According to a further broad aspect of the present invention there is provided a method of securing a secondary tubular flue in a water holding tank of a bottom-fired gas water heater. The method comprises providing a secondary tubular flue conduit having opposed straight tubular end sections and an intermediate helical section integrally formed. The tubular end sections each have a threaded connecting end portion extending from an end opening thereof. The secondary tubular flue is inserted from a bottom open end of the water holding tank prior to installing a bottom wall of the water holding tank with the bottom wall having a straight central flue secured thereto. An upper one of the opposed straight tubular section is positioned in a hole formed in a top end section of the water holding tank and a lower one of the opposed straight tubular section in a hole formed in a side wall of the water holding tank spaced a predetermined distance from the bottom wall of the tank. The dielectric tank connectors are assembled onto the threaded connecting end portion of each of the straight tubular end sections to connect the tubular end sections to a metal ring immovably secured about an outer surface of the water holding tank about the hole to provide an electrically insulated and leak proof connection.

According to a further broad aspect of the present invention the secondary tubular flue is mounted in a water holding tank of a down-fired gas water heater. The water heater has at least one sacrificial anode disposed in the water holding tank. A primary flue extend in the tank and communicates at a top end thereof with the combustion chamber and at a bottom end with a secondary tubular flue disposed in the water holding tank. The secondary flue has a helical section disposed about the primary flue. The secondary tubular flue has a top connecting end section adapted to form part of a top dielectric connector for securement to the bottom end of the primary flue inside the tank. The secondary tubular flue has a bottom connecting end section adapted to form part of a bottom dielectric tank connector for securement in an exit hole formed in a side wall of the water holding tank spaced above a bottom wall of the water holding tank. A blower displaces the combustion gas from the combustion chamber through the primary flue and the secondary tubular flue and through an exhaust pipe connected to the bottom connecting end section outside the exit hole to exhaust cooled flue gas to atmosphere

DESCRIPTION OF THE DRAWINGS

A preferred embodiment of the present invention will now be described with reference to the accompanying drawings in which:

FIG. 4B is a fragmented end view of an end section of the secondary tubular flue showing a modification for mounting the lock nut thereto;

FIG. 5A is a perspective view illustrating an example of the construction of the secondary tubular flue of the present invention;

FIG. 5B is a side view of FIG. 5A,

DESCRIPTION OF THE PREFERRED EMBODIMENT

Figure 1:
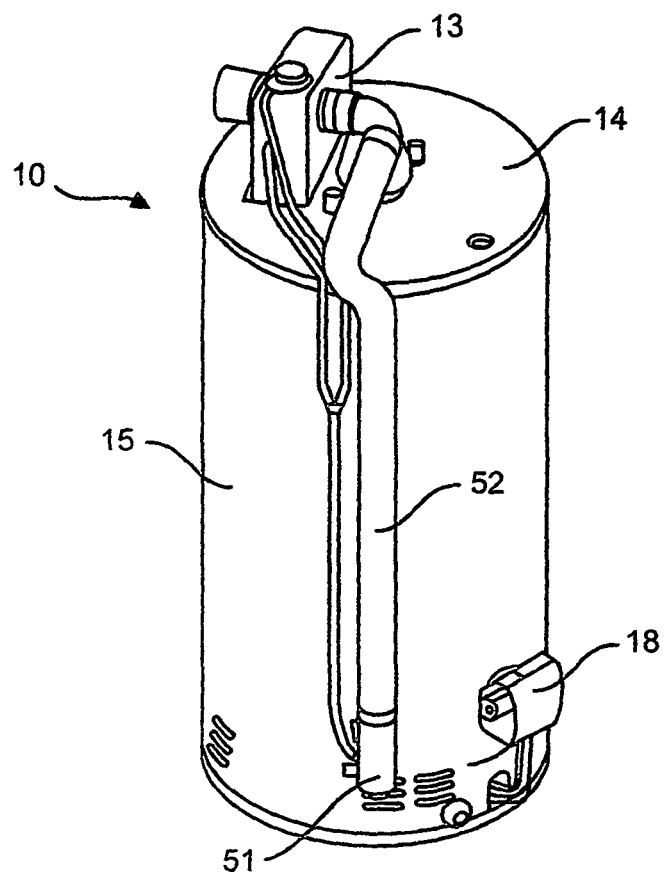
FIG. 1 is a perspective view of a bottom-fired gas water heater equipped with the secondary tubular flue of the present invention mounted inside the water holding tank which is housed in the outer shell shown herein.
Figure 2:
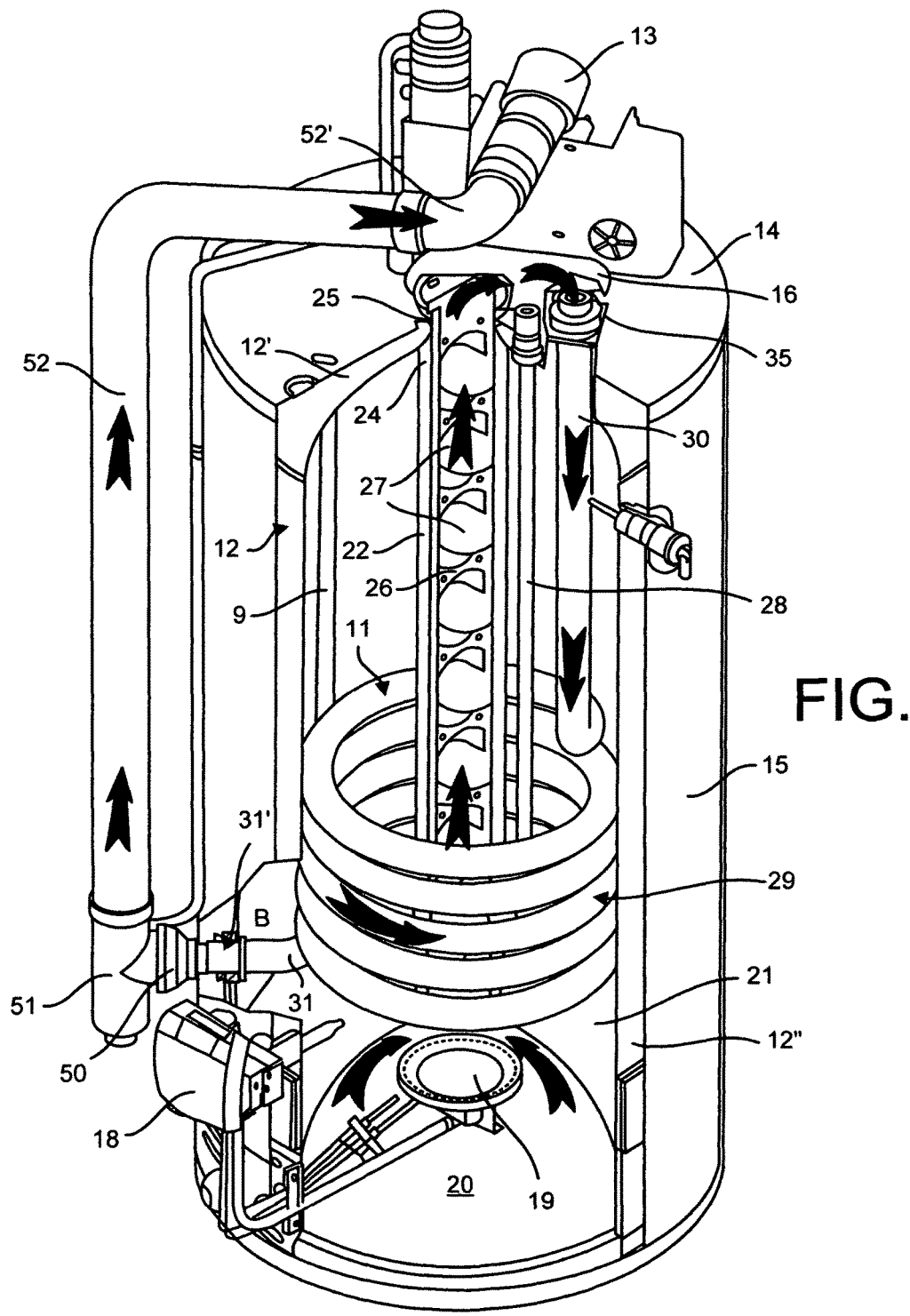
FIG. 2 is a perspective view, partly fragmented, which illustrates basic parts of the construction of a bottom-fired gas water heater constructed in accordance with the present invention.

Referring now to the drawings, and particularly to FIGS. 1 and 2, there is shown generally at 10 a bottom-fired gas water heater fitted with the secondary tubular flue 11 of the present invention mounted inside the water holding tank 12. As herein shown a blower 13 is mounted on the top wall 14 of the outer shell 15 of the water heater and connected to an exhaust flue pipe 52 through which exhaust flue gases from the bottom of the secondary tubular flue are drawn and exhausted to the atmosphere. A control 18 operates the burner 19 which is positioned in the combustion chamber 20.

With additional FIG. 2, there is shown details of the construction of the condensing flue water heater of the present invention. As shown in FIG. 2, the water holding tank 12 has a bottom wall 21 which defines the top wall of the combustion chamber 20 which is in contact with the water in the water holding tank. A central primary flue 22 extends through the tank and communicates at a bottom end through a central hole 23 (see FIG. 8) in the bottom wall 21 with the combustion chamber. The top end 24 of the primary central flue 22 exits the top wall 12' of the tank through a hole 25. A flue connector 16, formed of suitable metal or plastics material, links the top end of the primary flue 22 to the secondary tubular flue 11 to channel the hot gases therein. A flue baffle assembly 26 equipped with damper plates 27 is disposed inside the primary central flue to increase the travel path of the hot exhaust gases and create turbulence to improve heat transfer to the water contained in the water holding tank. Such baffle assemblies are well known in the art. One or more sacrificial anode rods 9 are connected to the top wall 12' of the tank and extends therein spaced from all internal components inside the tank to prevent corrosion of exposed metal by being consumed in place of the exposed metal it is protecting. A dip tube 28 conducts the domestic water supply to the bottom end of the water holding tank.

With reference to the additional FIGS. 3 to 5B, the secondary tubular flue 11 of the present invention is comprised of a flue conduit shaped to have a helical tubular section 29 disposed between a substantially straight opposed sections 30 and 31, and which is better illustrated in FIGS. 5A and 5B. The flue conduit 11 may be formed from regular straight wall tubing, corrugated metal tube or fin tube or other known suitable tubing to improve heat exchange with the water contained in the tank. The helical tubular section 29 has its coil windings 29' inclined at a downward angle, as better seen in FIG. 5B, to evacuate condensation formed therein towards the bottom section 31 which is also downwardly inclined. These straight sections 30 and 31 each have straight connecting end sections 30' and 31' which form part of a respective dielectric tank connector for securement in a respective hole formed in the top wall 12' and a lower end of the side wall 12" of the tank 12 above the combustion chamber 20. The straight connecting end sections 30' and 31' each have a pressure flange 32 immovably secured transversely thereabout by welding or brazing or other suitable means. These pressure flanges 32 are spaced a predetermined distance from the end openings 33 of the connecting end sections 30' and 31'. The pressure flanges 32 form an inner part of their respective dielectric tank connectors. The purpose of the dielectric tank connectors is to electrically insulate the secondary tubular flue 11 from the tank wall to make the secondary tubular flue 11 independent from the tank. Also, the dielectric tank connectors, as will be described further on, do not require any welding to the tank wall for their securement thereto and provide a dielectric and water-tight seal about the holes formed in the tank wall through which the connecting end sections 30' and 31' protrude. As previously mentioned, these connectors preserve the integrity of the tank in contrast to a welded connection that would draw protection from the sacrificial anode rod and by default reduce the life expectancy of the water heater. Because the interior of these tanks are pre-glassed lined before the secondary tubular flue is installed, welding with the glass lining could lead to cracks in the glass coating and coating burn-off which would also lead to lower tank life. Also, welding is a longer process and requires certified welders. The secondary tubular flue 11 may be fabricated from stainless steel, copper-nickel, or as a glass lined steel pipe. Other suitable metals are also contemplated.

Figure 3:
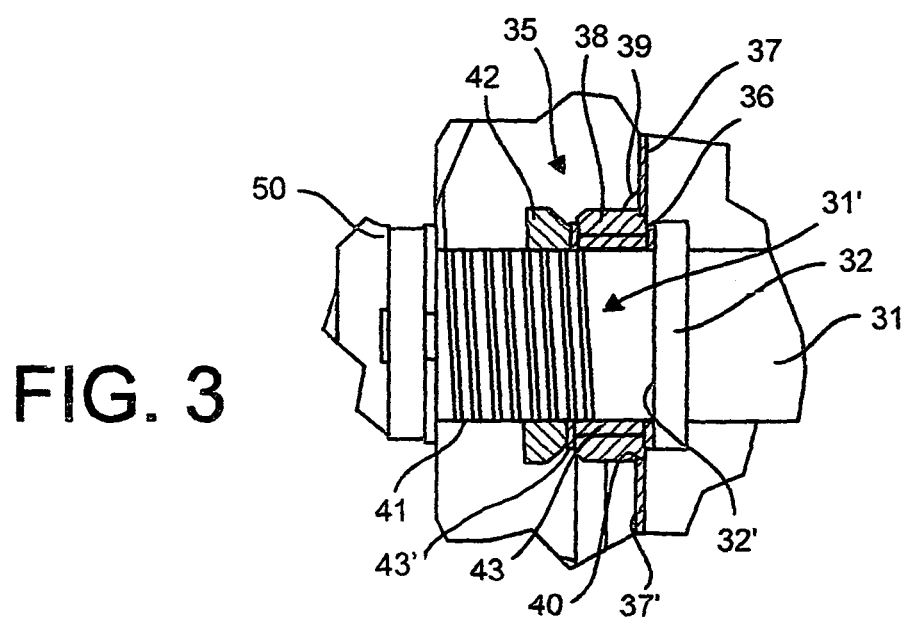
FIG. 3 is a side view, partly sectioned and fragmented, to illustrate an example of the construction of the dielectric connector for securing the end sections of the secondary tubular flue to the tank walls.

The entire construction of a first example of the dielectric end connectors 35 is illustrated in FIG. 3. These dielectric end connectors 35 are identical at opposed ends of the secondary tubular flue 11 and only the lower one is described herein. The dielectric connector 35 is comprised of a dielectric and water tight/resistant material annular flat gasket 36 which is fitted over the connecting end sections 30' and 31' from the end opening 33 thereof and slid against an outer face 32' of the pressure flange 32 whereby to electrically isolate the pressure flange 32 from the inner surface 37 of the tank when the pressure flange is biased under pressure against the inner surface 37 of the tank wall and forms a water-tight seal about the hole 40 formed in the tank wall in the upper section and lower section of the tank.

The dielectric connector 35 has an outer portion which is comprised of an outer metal ring 38 which is welded, as indicated by reference numeral 39 or otherwise immovably secured to the outer surface 37' of the tank wall 12" and extends partly in the hole 40 formed therein for the passage of the connecting end section 31'. A sleeve 43 formed of electrically insulating material, such as a phenolic-like substance capable of resisting to the temperature of the flue conduit, is disposed over the connecting end section 30' and fitted under the outer metal ring 38 to electrically insulate the connecting end section from the metal ring 38 and hence the tank wall 12". The sleeve extends the entire length under the outer metal ring. The free end section of the connecting end sections 30' and 31' is also provided with a connection means in the form of a threaded section 41 formed on the outer surface of the free end section. A locking member in the form of a compression nut 42 is threadably engaged with the threaded section 41. Before installing the compression nut 42 a further dielectric washer 43' is positioned about the connecting end section 31' and slid against the outer face of the metal ring 38 to electrically isolate the compression nut, which is in contact with the connecting end section 31' of the secondary tubular flue, from the outer metal ring which is in contact with the tank wall. By threading the compression nut 42 over the threaded section 41 and against the outer face of the outer metal ring, a pulling force is applied to the pressure flange 32 which in turn applies a compression force against the dielectric/water tight and/or sealing gasket 36 disposed between the outer face of the pressure flange and the inner surface 37 of the tank wall to provide a leak proof and electrically isolated connection about the hole 40. The pressure of the water within the tank also applies a compression force against the pressure flange.

Figure 4A:
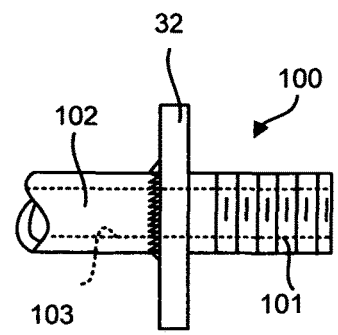
FIG. 4A is a simplified side view showing an alternative design for the provision of the pressure flange and wherein a casted fitting is welded to straight ends of the secondary tubular flue.

FIG. 4A illustrates another example of the construction of the connection of the pressure flange 32 to the secondary tubular flue. As herein shown, the flange 23 is incorporated in a casted fitting 100 of non-corrosive metal, such as copper-nickel alloy, and which has a tubular threaded extension 101 to form the connecting end sections 30' and 31'. The flange is a circumferential flat flange as previously described and a straight transverse end 102 of the tube is welded, with a like metal, about the hole formed in the flange and aligned with the tubular threaded extension. The fitting 100 may be disposed inwards of the tank or outwards thereof, and wherein in the later case the weld would be performed outwards with the end sections 30' and 31' projecting out of the tank wall through its respective hole.

FIG. 4B illustrates an alternative to the formation of threads on the outer surface at the free end portion of the connecting end sections 30' and 31', this alternative is to secure a sleeve 45 having an outer threaded surface 46 about unthreaded connecting end sections of the secondary tubular flue. The sleeve is welded or brazed over the free end of the connecting sections 30' and 31' to receive the lock nut in threaded engagement therewith. This also solidifies the connecting end sections.

As shown in FIGS. 2 and 3, a variable diameter pipe coupling 50 formed of flexible material or other suitable material, interconnects the end section of the connecting end section 31' of the secondary tubular flue 11 to a drain trap 51 secured at a bottom end of an exhaust pipe 52 to evacuate condensation. The hot gases which have been cooled leave the secondary tubular flue at a temperature of about 110 to 125 degrees F. The hot gases are aspired by the blower 13 connected to the top end 52' of the exhaust pipe 52. The exhaust pipe and condensate trap are formed of suitable plastics material well known in the art.

With reference now to FIGS. 5A, and 5B, it can be observed that the secondary tubular flue 30 is formed with the intermediate tubular helical section 29' disposed in a coil winding arrangement located substantially in a bottom third portion of the secondary tubular flue. With this configuration the helical section 29' can be located in the bottom portion of the tank where the water is the coldest whereby to provide for a greater delta-T, differential in the temperature between the water in the water holding tank and the hot exhaust gases flowing through the helical section to thereby increase the thermal efficiency of the water heater.

The secondary tubular flue 11 of the present invention with its dielectric connectors provide for an ease in assembly with precise positioning in a water holding tank of a bottom-fired gas water heater. The tank is provided with holes for the passage and connection of the opposed straight tubular sections 30' and 31' of the secondary tubular flue. The tank inner surface is glass lined before assembly of its internal components. In the assembly, the dielectric material flat annular gasket 36 is installed against the outer face 32' of the pressure flange 32. The secondary tubular flue is then inserted from the bottom open end of the tank and the upper one of the opposed straight tubular section is positioned in the hole formed in the top wall of the tank. The lower one of the opposed straight tubular section is inserted in a hole formed in the side wall 12" of the tank spaced above a bottom wall. The dielectric connectors 35 are then assembled and the compression nut 42 tightened to provide for the gasket 36 to be compressed against the inner surface of the tank wall about the hole by the flange 32 to provide the dielectric insulated connection and a leak proof seal. The gasket 36 has a predetermined thickness to be sufficiently compressed to produce the leak proof seal. The securement of the connectors also automatically positions the helical tubular section at a precise location within the tank to receive the central flue of the bottom wall 21 of the tank at the center thereof. Essentially, the assembly is very simple, quick and no welding is required to secure the secondary tubular flue to the tank wall.

Figure 9:
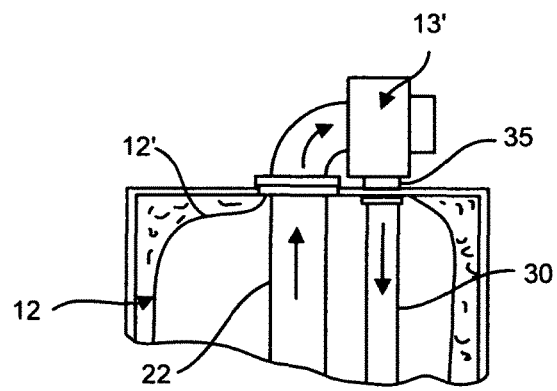
FIG. 9 is a simplified, partly sectioned and fragmented view showing the blower mounted on the top wall of the outer shell of the water heater between the central primary flue and the inlet of the secondary tubular flue and blowing down through the secondary flue, and, FIG. 10 is a simplified side sectional view of a down-fired water heater in which is mounted the secondary tubular flue of the present invention with its dielectric connections.

Referring now to FIG. 9, there is shown a further modification of the water heater of the present invention wherein the blower is mounted on the top wall 14 of the outer shell 15 and interconnects to the top end 24 of the primary central flue 22 to the connector 35 of the secondary tubular flue secured to the top wall 12' of the water holding tank 12. The blower draws the hot gases from the combustion chamber 20, through the central flue and redirects the hot gases into the secondary tubular flue 11, as shown by the arrows, and out to atmosphere through an exhaust flue pipe.

Figure 6:
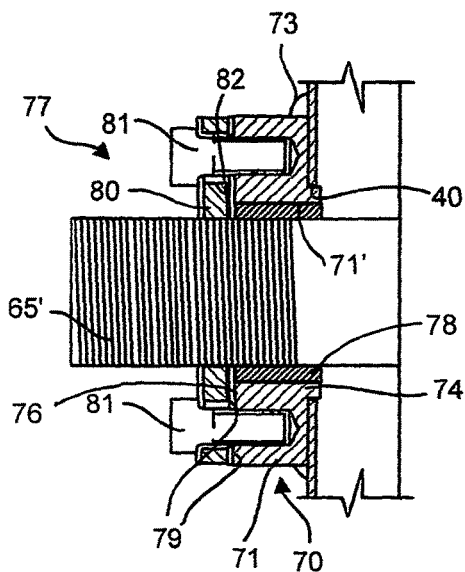
FIG. 6 is a side view, partly sectioned and fragmented, to illustrate a further example of the construction of the dielectric connector for securing the end sections of the secondary tubular flue to the tank walls.
Figure 7:
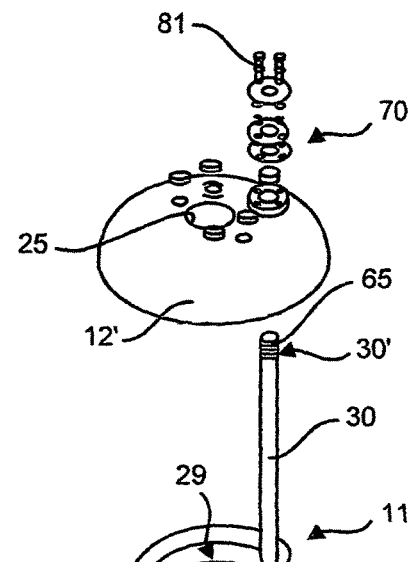
FIG. 7 is a fragmented front view showing the outer metal ring welded to the outer surface of the water holding tank wall.
Figure 7:
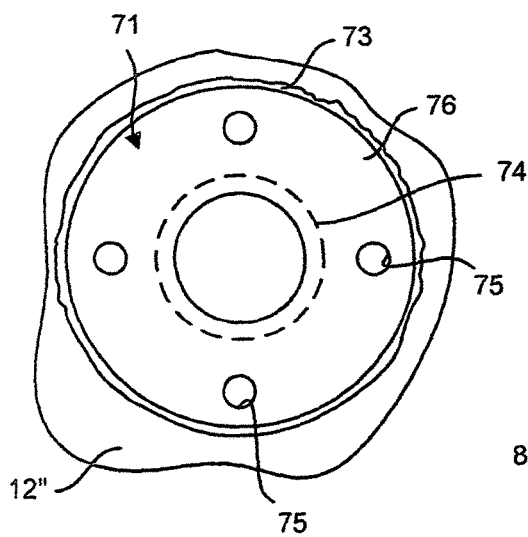
Figure 8:
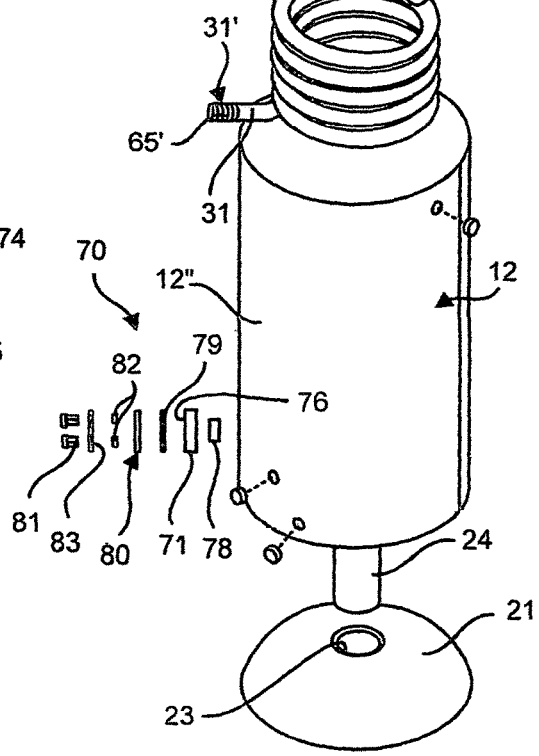
FIG. 8 is an exploded perspective view of the water holding tank and the secondary tubular flue and its dielectric connector parts.

Referring now to FIGS. 6 to 8, there is shown another example of the construction of the connecting end sections 30' and 31' of the secondary tubular flue 11. Has herein shown, the connecting sections do not have the pressure flanges 32 and therefore the dielectric connectors do not have an internal portion. The end portions of the secondary tubular flue are simply threaded end portions 65 and 65'. These end portions are simply positioned through their respective holes formed in the tank top wall 12' and the lower end of the side wall, as previously described. FIG. 6 illustrates the construction of this alternative dielectric tank connector 70 and seeing that this connector is the same at both ends of the secondary tubular flue, only the lower one is described herein.

The dielectric tank connector 70 is assembled and secured entirely from outside the tank and there are no internal parts, making the assembly practically fool-proof. As with the previously described dielectric connector 35, there is a locking ring 71 welded or braised to the outer surface of the tank walls about the holes 40 as shown by weld bead 73. The locking ring 71 is a thick circular annular metal ring having a central bore 72 dimensioned to receive the connecting end sections 30' and 31' of the secondary tubular flue. The ring also has an inner collar portion 74 which is closely fitted inside the hole 40, see FIG. 6. Threaded bores 75 are also machined in the flat outer face 76 of the locking ring 71.

The dielectric tank connector 70 is comprised of a dielectrically insulated waterproof locking assembly 77 mounted on the threaded connecting end portions 65 and 65'. A dielectric sleeve 78 is disposed about the threaded connecting end portion 65' and slid between the inner surface 71' of the ring 71 and about the end section of the lower straight tubular section 31 to electrically isolate the ring 71, and hence the tank wall, from the tubular section 31. A watertight flat dielectrically insulating annular compressable and deformable gasket 79 is then positioned in close friction fit on the connecting end section 65' and slid over the outer face 76 of the locking ring 71. An electrically isolated annular mounting flange 80 is then threadably and displaceably engaged about the threaded end portion 65' until it abuts against the seal gasket 79 with holes formed in the mounting flange aligned with the threaded bores 75 formed in the locking ring 71. In this example the mounting flange 80 is formed on non-conductive material such as plastics. Bolts 81 are then disposed in the holes of the flange 80 and screwed into the threaded through bores 75. This compresses the seal gasket 79 to deform and squeeze against the threaded end portion 65' forming a leak proof and dielectric seal. When the bolts 81 compress the seal gasket 79 the threaded end portion 65' is displaced a minor distance inside the tank. The seal gasket 79 may have a bead annular formation about its circular central opening to provide more sealing material above the threaded end portion 65'

If the mounting flange 80 is constructed of metal, bushings 82 are disposed in the holes formed in the flange 80. Also, a dielectric gasket 83 is fitted about the threaded end portion 65' and pushed against the outer face of the flange 80 to electrically isolate the flange. The non-conductive flange is therefore the preferred mounting part. As can be observed, the entire dielectric connector is on the outside of the tank wall.

FIG. 8 is an exploded view of the assembly and its installation was previously described with reference to the first dielectric connector example. The parts of the second dielectric connector 80 are shown in this figure.

Figure 10:
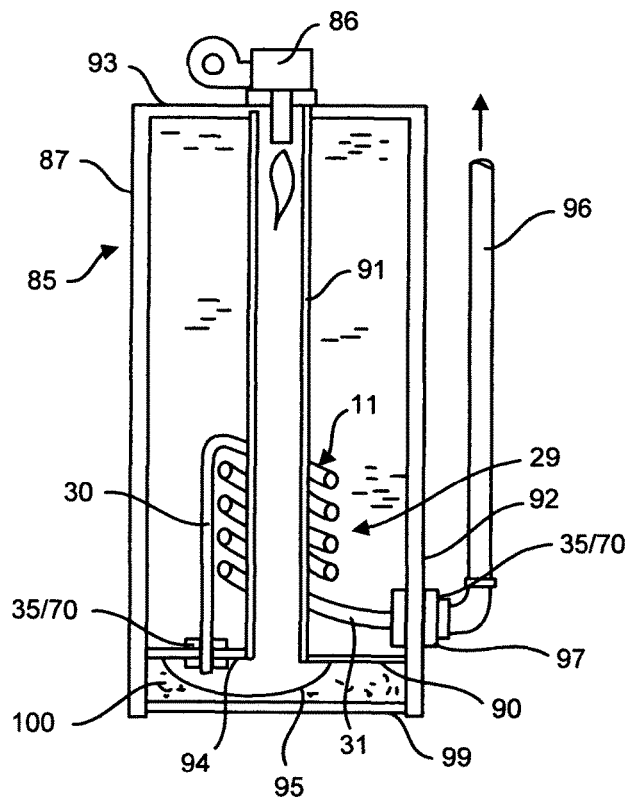

Referring now to FIG. 10, there is shown generally at 85 a down-fired water heater wherein a power burner 86 is mounted at the top of the water holding tank 87. The burner flame 88 projects inside the central flue 89 in the top part thereof about which the water inside the tank is at its hottest temperature. Although not shown, but obvious to a person skilled in the art, the domestic cold water supply is introduced at the bottom of the tank 87 by suitable means such as a dip tube, not shown. Therefore, the coldest part of the water within the tank is at the bottom. As herein shown, the secondary tubular flue 11 of the present invention is mounted inside the tank through the bottom wall 90 of the tank 87 before the bottom wall is installed. The dielectric connectors can be either of the connectors 35 or 70 previously described. The installation may be performed by disposing in the helical coil section 29 about the central flue 91 which is secured to the top wall 93 of the tank and depends therein. The end section 31 of the secondary flue is positioned in the hole provided at the bottom end section of the side wall 92 and secured thereto by the side connector 35/70 in a manner as previously described. The end section 30 is then positioned in the hole 94 as the bottom wall 90 is fitted in position. To position the end section 30 in the hole 94, one method is to position a straight wood peg, not shown, in the bottom end of straight section to align the hole 94 with the straight end section 30 which is caused to protrude through the hole as the bottom wall sits in position for welding. The bottom dielectric connector 35/70 is then secured. The gas transfer chamber 95 is installed to direct the hot gases from the central flue 91 into the secondary tubular flue 11.

The hot gases are pushed through the secondary flue 11 and out to atmosphere through an exhaust pipe 96. A condensate trap 97 is located at the bottom end of the exhaust pipe. As herein illustrated the hot gases leaving the central flue 91 enter the bottom end portion of the tank where the water is at its coldest temperature and thus providing the maximum delta-T for heat exchange through the sections 30, 31 and the coil 29 of the secondary tubular flue. A bottom plate 99 is secured across the bottom end of the water heater forming a chamber 100 into which high temperature insulation is disposed to prevent heat loss.

It is within the ambit of the present invention to cover any obvious modification or improvements of the preferred embodiment described herein provided such falls within the scope of the appended claims. Accordingly, the invention is not limited to the specific details shown and described herein.

The invention claimed is:

1. A condensing flue water heater comprising a water holding tank constructed of metal and having a glass-lined inner surface, a combustion chamber at a bottom end of said water holding tank, at least one sacrificial anode disposed in said water holding tank, a primary metal flue extending through said tank and communicating at a bottom end thereof with said combustion chamber and exiting at a top wall of said water holding tank through an exit opening, a secondary tubular flue also formed of metal disposed in said water holding tank and having a helical section disposed substantially equidistantly spaced about said primary metal flue, said secondary tubular flue having a top connecting end section adapted to form part of a top dielectric tank connector for securement in a hole formed in a wall in a top part of said tank, said secondary tubular flue having a bottom connecting end section adapted to form part of a bottom dielectric tank connector for securement in a hole formed in a side wall of said water holding tank spaced above said combustion chamber, flue connecting means interconnecting said exit opening of said primary flue with a top opening of said secondary flue, and a blower for the displacement of combustion gas from said combustion chamber through said primary flue and said secondary tubular flue and through an exhaust pipe to atmosphere, said top and bottom dielectric connectors each being comprised by a connecting end portion of said top end section and said bottom end section of said secondary tubular flue dimensioned to project a predetermined distance out of their respective hole formed in said wall in said top part of said tank and said hole formed in said side wall of said water holding tank, respectively; an insulating sleeve of non-conductive material about each said connecting end portion and extending through respective ones of said holes, a dielectrically insulating component assembly about said connecting end portions and in communication between said connecting end portion and said tank wall about said holes in said top part of said tank and said side wall of said tank, and compression means engageable exteriorly of said water holding tank for applying compression to said dielectrically insulating component assembly to form a dielectrically insulated water-tight seal between said connecting end portions and said tank about said holes.

2. The condensing flue water heater as claimed in claim 1 wherein said secondary tubular flue is one of a stainless steel and a glass-lined metal tubular flue.

3. The condensing flue water heater as claimed in claim 1 wherein said connecting means is a sealed connecting flue duct mounted on a top wall of an outer shell of said water heater.

4. The condensing flue water heater as claimed in claim 1 wherein said blower is secured to an outer casing of said water heater and coupled to a bottom opening of said secondary tubular flue to create a suction from said bottom opening.

5. The condensing flue water heater as claimed in claim 4 wherein said blower is mounted on a top wall of an outer casing of said water heater and coupled to said bottom opening through said exhaust duct.

6. The condensing flue water heater as claimed in claim 1 wherein said blower is mounted on a top wall of an outer casing of said water heater between said exit opening of said primary flue and a top opening of said secondary flue, said blower forming part of said connecting means.

7. The condensing flue water heater as claimed in claim 1 wherein said top and bottom connecting end sections of said secondary tubular flue is provided with a pressure flange immovably secured transversely thereabout and spaced a predetermined distance from an end opening of said top and bottom connecting end sections of said secondary tubular flue, said pressure flange forming an inner part of a respective one of said top and bottom dielectric tank connectors.

8. The condensing flue water heater as claimed in claim 7 wherein said pressure flange of each said top and bottom dielectric tank connectors is provided with a dielectric material gasket fitted against an outer face of said pressure flange to electrically isolate said free end sections of said secondary tubular flue from a wall of said water holding tank in said top part thereof and said side wall of said tank when said top and bottom connecting end sections are disposed in their respective holes to position said top and bottom openings outside said water holding tank.

9. The condensing flue water heater as claimed in claim 8 wherein said dielectric material gasket is an annular flat gasket having a predetermined thickness and opposed flat surfaces for abutment between said outer face of said pressure flange and an inner surface of said tank wall surrounding said holes.

10. The condensing flue water heater as claimed in claim 8 wherein said dielectric tank connector has an outer portion comprised of a metal ring immovably secured about an outer surface of said water holding tank about said hole formed in said top part of said water holding tank and said side wall of said water holding tank, said compression means being a locking member engageable about a connecting end portion extending from said end opening of said top end and bottom connecting end sections of said secondary flue for displaceable abutment against a dielectric washer disposed about said end sections between said metal ring and said locking member, said locking member urging said pressure flange against said inner surface of said tank wall to apply a compression force against said dielectric material gasket disposed between said outer face of said pressure flange and said inner surface of said tank wall about said respective holes to provide a leak proof and electrically isolated connection.

11. The condensing flue water heater as claimed in claim 10 wherein said metal ring is a steel ring welded to said outer surface of said water holding tank about said holes.

12. The condensing flue water heater as claimed in claim 6 wherein said connecting end portion of said top end and bottom connecting end sections of said secondary tubular flue is a threaded end portion.

13. The condensing flue water heater as claimed in claim 12 wherein said locking member is a compression nut threadably engaged and displaceable about said threaded end portion.

14. The condensing flue water heater as claimed in claim 10 wherein said connecting end portion is constituted by a sleeve having an outer threaded surface, said sleeve being immovably secured about said connecting end sections, said locking member being a compression nut threadably engaged and displaceable about said threaded surface of said sleeve.

15. The condensing flue water heater as claimed in claim 10 wherein said dielectrically insulating component assembly includes an electrically insulated sleeve disposed about a portion of each said top and bottom connecting end sections and positioned under said metal ring to electrically insulate said top and bottom end sections from said metal ring.

16. The condensing flue water heater as claimed in claim 15 wherein said electrically insulated sleeve is dimensioned for close fit between said dielectric washer and said dielectric material gasket.

17. The condensing flue water heater as claimed in claim 8 wherein said top and bottom connecting end sections of said secondary tubular flue are each further provided with a connecting end portion extending from an end opening thereof.

18. The condensing flue water heater as claimed in claim 17 wherein said connecting end portions are each constituted by an outer threaded section formed about at least an outer surface portion of said connecting end section from said end opening thereof, said compression means being compressed by a compression applying locking member threadably displaceable about said outer threaded section.

19. The condensing flue water heater as claimed in claim 1 wherein said helical section of said secondary tubular flue is an intermediate section disposed at a location between said top and bottom connecting end sections whereby to be disposed at a predetermined location about said primary flue, said primary flue being a straight vertical cylindrical flue pipe.

20. The condensing flue water heater as claimed in claim 1 wherein said secondary tubular flue has a straight upper section which extends vertically in said water holding tank with said top dielectric tank connector thereof being secured in said hole which is formed in a top wall of said water holding tank, said intermediate helical section being an inclined helical section slopping transversely downwards from said straight upper section, and a straight downwardly inclined lower section for directing condensation in said secondary tubular flue outwardly of said water holding tank with said bottom dielectric tank connector secured in said hole spaced a predetermined distance above said combustion chamber.

21. The condensing flue water heater as claimed in claim 20 wherein said dielectric tank connector secured spaced above said combustion chamber of said water holding tank has a pipe coupling secured to said connecting end section thereof for securing an exhaust pipe thereto, and a condensate drain trap provided at a bottom end of said exhaust pipe adjacent said pipe coupling to evacuate condensate fluid from said secondary tubular flue, said blower being secured to said exhaust flue pipe.

22. The condensing flue water heater as claimed in claim 21 wherein said blower is mounted on a top wall of an outer casing of said condensing flue water heater.

23. The condensing flue water heater as claimed in claim 20 wherein said top and bottom connecting end sections of said secondary tubular flue incorporates a fitting secured to said secondary tubular flue and having a circumferential flat flange having a central hole about which said secondary tubular flue is welded, a tubular extension tube extends from the opposed side of said flange and has a hole therein aligned with said central hole in said flange, said tubular extension having an outer threaded end portion and being of a diameter adapted to extend through said holes formed in said tank.

24. The condensing flue water heater as claimed in claim 1 wherein said primary flue is provided with internal baffles to increase the travel path of said hot flue gases propagating thereabout from said combustion chamber to said exit opening and drawn out by said blower.

25. The condensing flue water heater as claimed in claim 17 wherein said connecting end portion is a threaded connecting end portion.

26. The condensing flue water heater as claimed in claim 25 wherein said top and bottom dielectric tank connectors are respectively comprised of a metal ring immovably secured about an outer surface of said water holding tank about said hole formed in said top part of said water holding tank and said side wall of said water holding tank, said dielectrically insulating component assembly being threadably secured to said threaded connecting end portion.

27. The condensing flue water heater as claimed in claim 26 wherein said dielectrically insulated component assembly is comprised of a dielectric sleeve disposed about said connecting end section to isolate said connecting end section from said tank wall about said hole and said metal ring, a water-tight dielectrically insulating annular gasket about said connecting end section and a connecting face of said metal ring, and an electrically isolated annular mounting flange threadably and displaceably engaged about said connecting end section, and wherein said compression means is a pressure applying locking means for interconnecting said annular mounting flange with said connecting face of said metal ring and compressing said insulating annular gasket.

28. The condensing flue water heater as claimed in claim 27 wherein said pressure applying locking means is constituted by pressure applying bolts extending through mounting holes formed in said annular mounting flange and in threaded engagement with threaded bores formed in said connecting face and aligned with said mounting holes.

29. The condensing flue water heater as claimed in claim 27 wherein said electrically isolated annular mounting flange is formed from a non-electrically conducting material.

30. The condensing flue water heater as claimed in claim 27 wherein said electrically isolated annular mounting flange is a metal flange, dielectric bushings fitted in said mounting holes of said annular mounting flange and an external dielectric flat annular gasket over an outer surface of said annular mounting flange at least in the area of said mounting holes to electrically insulate said pressure applying bolts from said connecting end portion of said secondary flue.

31. The condensing flue water heater as claimed in claim 27 wherein said electrically isolated annular mounting flange is threadably and displaceably engaged on said connecting end section to a predetermined distance from said end opening of said connecting end section and positioned for abutment against said water-tight dielectric insulating annular gasket, said pressure applying means compressing said annular gasket between said connecting face of said metal ring and an inner face of said annular mounting flange while causing slight inward displacement of said connecting end section in said water holding tank.

\* \* \* \* \*